United States Patent
Koormann et al.

(10) Patent No.: US 7,594,691 B2
(45) Date of Patent: Sep. 29, 2009

(54) MOTOR VEHICLE WITH SIDE-IMPACT REINFORCEMENT

(75) Inventors: Markus Koormann, Osnabruck (DE); Markus Exner, Belm (DE); Thomas Hessel, Munster (DE)

(73) Assignee: Wilheim Karmann GmbH, Osnabrueck (DE)

( * ) Notice: Subject to any disclaimer, the term of this patent is extended or adjusted under 35 U.S.C. 154(b) by 347 days.

(21) Appl. No.: 10/599,211

(22) PCT Filed: Mar. 3, 2005

(86) PCT No.: PCT/DE2005/000355

§ 371 (c)(1),
(2), (4) Date: Sep. 22, 2006

(87) PCT Pub. No.: WO2005/095184

PCT Pub. Date: Oct. 13, 2005

(65) Prior Publication Data

US 2008/0252101 A1    Oct. 16, 2008

(30) Foreign Application Priority Data

Mar. 24, 2004   (DE) ................ 10 2004 014 796

(51) Int. Cl.
*B62D 23/00*     (2006.01)
(52) U.S. Cl. ............................ 296/187.12; 296/193.02
(58) Field of Classification Search ........... 296/187.12, 296/187.03, 193.02
See application file for complete search history.

(56) References Cited

U.S. PATENT DOCUMENTS 4,090,734 A * 5/1978 Inami et al. .............. 296/146.6
4,934,751 A * 6/1990 Shimoda ................. 296/203.03
6,168,228 B1 * 1/2001 Heinz et al. ............ 296/187.12

* cited by examiner

*Primary Examiner*—Joseph D Pape
(74) *Attorney, Agent, or Firm*—Quinn Law Group, PLLC.; Christopher W. Quinn (57) ABSTRACT

A vehicle having a B-pillar, a side-sill arrangement into which the B-pillar extends and a transverse reinforcement that extends in the transverse direction to above the side-sill arrangement and adjacent to a lower end of the B-pillar, is characterized in that a plate-like impact element arranged in the longitudinal direction and upright, is connected on an inside side outer end of transverse reinforcement.

19 Claims, 8 Drawing Sheets

MOTOR VEHICLE WITH SIDE-IMPACT REINFORCEMENT

CROSS-REFERENCE TO RELATED APPLICATIONS

This application is a US National Phase of International Application No. PCT/DE 2005/000355, filed Mar. 3, 2005, which claims priority to German 10 2004 014 796.5, filed Mar. 24, 2004. The entire contents of the above identified applications are incorporated herein by reference.

TECHNICAL FIELD

The invention relates to a vehicle, especially a coupe or convertible vehicle, with a B-pillar, a side-sill assembly, into which the B-pillar opens, and a transverse reinforcement that extends in the transverse direction to above the side-sill arrangement and adjacent to a lower end of the B-pillar.

BACKGROUND OF THE INVENTION

This type of vehicle is known, for example, from German Utility Model DE 297 14 656. There, essentially vertically aligned reinforcement profiles are arranged to absorb impact forces acting laterally on the vehicle.

In passenger cars in the form of convertibles or coupes, there is the general problem that the B-pillar ends on both sides of the body in the area of the parapet line and therefore beneath the side window area. The B-pillars each extend downward into a side-sill arrangement, which is also part of the support structure of the body. Since the B-pillars, in their upper end area, have no connection to a roof frame of the body structure, they are designed relatively weak with respect to side impact loads, so that during a side impact the upper, free end of the B-pillar can be forced into the vehicle interior.

The known reinforcement tubes are still in need of improvement, to the extent that they have a relatively small cross-section and, on this account, can penetrate relatively far into a bumper structure of the vehicle impacting from the side during a side impact, whereas the rest of the bumper can extend deeply into the passenger compartment.

SUMMARY OF THE INVENTION

The task of the invention is to provide a vehicle with an improved side-impact protection.

This task is solved according to the invention by a vehicle, especially a coupe or convertible vehicle, with a B-pillar, a side-sill arrangement, into which the B-pillar extends, and a transverse reinforcement that extends in the transverse direction to above the side-sill arrangement and adjacent to a lower end of the B-pillar, the vehicle according to the invention being characterized in that a plate-like impact element arranged upright in the longitudinal direction is connected on the inside with a front end of the transverse reinforcement.

Through the arrangement of a plate-like impact element, an outer side surface, with which the bumper or front part of the impacting vehicle interacts during a side impact, is significantly increased relative to a known reinforcement tube, so that the possibility is created, to a much greater extent than previously, of absorbing the impact energy to the least possible degree by deformation of the side area and, to the greatest possible degree by deformation of the front area of the vehicle impacting from the side, which is in a much better position for this, since corresponding deformation paths are available, in contrast to the side area.

The front end of the transverse reinforcement, viewed in the direction of travel, can be arranged in front of or behind the B-pillar. It could also be provided that the front end of the transverse reinforcement passes through the B-pillar, at least partially, or vice versa.

It is particularly advantageous if the front end of the transverse reinforcement protrudes in the lateral direction above an outside of the B-pillar, so that the inside of the impact element has a spacing from the outside of the B-pillar. Because of this, it is assured that the B-pillar is not detrimentally affected during a side impact, but initially the impact element and the transverse support introduce the occurring loads as far as possible into the front structure of the laterally impacting vehicle.

It can be advantageous if the lower edge of the impact element is connected to the side-sill arrangement. In addition, a lower edge of the impact element can be arranged supported against an outside of the side-sill arrangement. A firm connection of the impact element to the side-sill arrangement is an advantage in order to prevent tilting of the impact element, if possible, during an impact in the area of or above the transverse reinforcement.

It can be provided that the impact element covers the front end of the transverse reinforcement and the B-pillar, at least partially, in the longitudinal direction.

A particularly advantageous arrangement is characterized in that an outer surface of the outer element is arranged vertically, or especially sloped outward above a vertical position, especially at an angle to the vertical in a range from 2° to 20°, preferably 10°. This has the advantage that a bumper of all-terrain vehicles (also called SUVs), among other things, arranged relatively high in comparison with ordinary passenger cars, has a tendency to be guided downward during a side impact and can be forced upward over the impact element and penetrate into the passenger compartment less easily.

In this context, it is also advantageous that the impact element extends to a relatively substantial height, especially to a height of about 60 cm above the ground, since bumpers or front structures of SUVs often reach this height.

For optimal implementation of the action mechanism of the impact element being explained, it is advantageous if the impact element has an essentially horizontal upper edge.

The impact element can be bonded and/or shape-fitted with the transverse reinforcement and, preferably, also connected to the longitudinal support arrangement.

Since it is not intended that a noticeable percentage of the impact energy be absorbed in the impact element itself, this is configured to be as rigid and non-deformable as possible, possibly with exception of the edges, where it can be expedient if the impact element is designed as a plate made of a solid material. A light metal can be advantageous for weight reasons.

An alternative consists of designing the impact element as a plate-like composite part. In this case, the impact element can have an internal shell, an external shell (for example, made of sheet metal), and a reinforcement structure arranged between them. In particular, the impact element can be designed as a honeycomb sheet, in which the internal and external shell consist of sheet metal and the reinforcement structure consists of corrugated sheet metal or sheet metal angled in zigzag fashion.

In one variant, the impact element can be designed as a honeycomb sheet in which the internal and external shell are formed from sheet metal and the reinforcement structure in the form of honeycomb elements extending in the transverse direction. The honeycomb elements can have a round or hexagonal cross-section.

It is appropriate to provide that the transverse reinforcement extends over the width of the vehicle between two B-pillars and side-sill arrangements and is provided on both sides, according to the invention, with an impact element, as explained previously.

Further advantages and features of the invention are apparent from the following description of a preferred example embodiment of the invention, in which reference is made to the drawings, in which:

DESCRIPTION OF THE PREFERRED EMBODIMENTS

Figure 1:
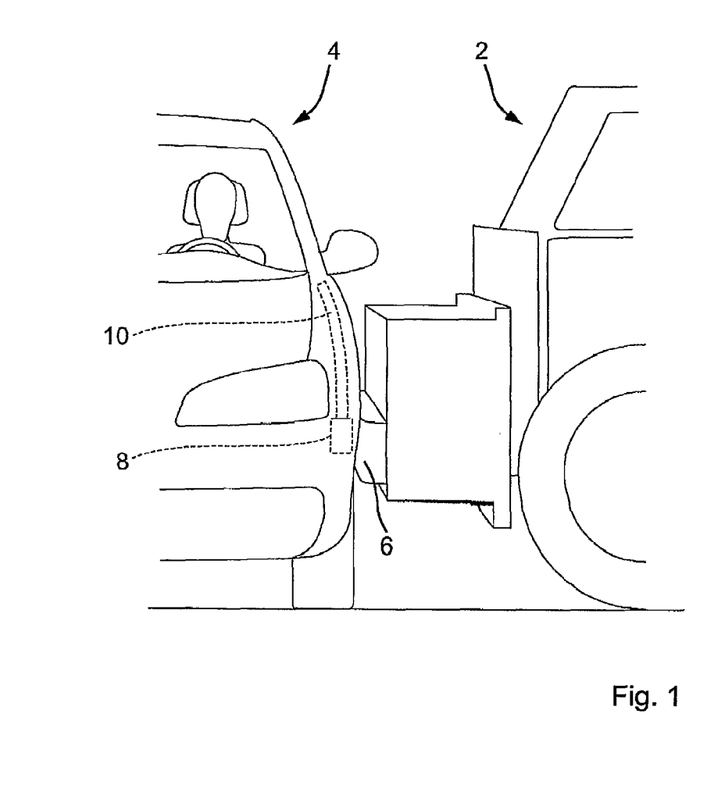
FIG. 1 shows, in a schematic view, a typical side-impact situation between two ordinary passenger cars.
Figure 2:
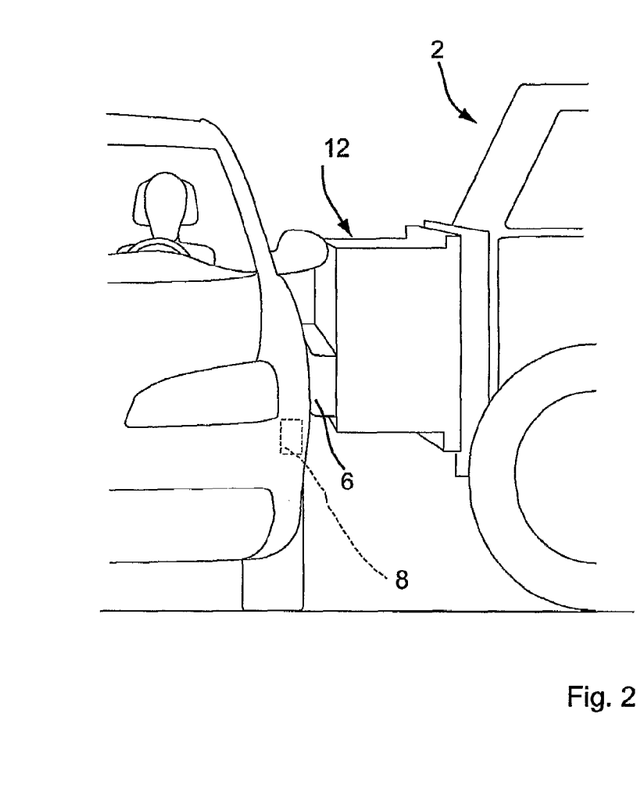
FIG. 2 shows a situation similar to that of FIG. 1, in which, however, the vehicle impacting from the side is a vehicle of the SUV type.

To explain the problem that the invention seeks to solve, FIGS. 1 and 2 are referred to first. FIG. 1 shows a typical side-impact situation, in which a vehicle 2 collides with a second vehicle 4 laterally at 90° to the direction of travel. The height of a bumper 6 of the laterally impacting vehicle 2 is situated here essentially at the same height as a side-sill arrangement 8 of the second vehicle 4, so that the impact energy generated is introduced to the longitudinal supports and leads to targeted deformation of the front area of the laterally impacting vehicle 2. Only when the laterally impacting vehicle 2 penetrates with its front area much farther into the second vehicle 4 or significantly deforms the structure of vehicle 2, can deformation of the B-pillar 10 of the second vehicle 4 in the interior of the vehicle occur, especially in a convertible vehicle, in which the B-pillar is not supported on its upper end or is designed above the parapet line in a lightweight version.

FIG. 2 shows another impact situation, in which the laterally impacting vehicle 2 is of the SUV (Sport Utility Vehicle) type, in which the bumper 6 is arranged much higher than in an ordinary passenger car, and especially higher than the side-sill arrangement 8. To this is added the fact that an upper edge 12 of the front area of the laterally impacting vehicle 2 lies much higher than in an ordinary passenger car, namely, at about the height of the head of the driver of the second vehicle 4.

These circumstances mean that the bumper 6 has a tendency, even after slight deformation, to slide away upward over the side-sill arrangement 8 and strike the B-pillar, which is then forced into the interior of the passenger compartment in a convertible vehicle, where upper support is lacking. In addition, head contact of the driver or passengers with the upper edge 12 of the front area of the laterally impacting vehicle 2 is to be feared.

Figure 3:
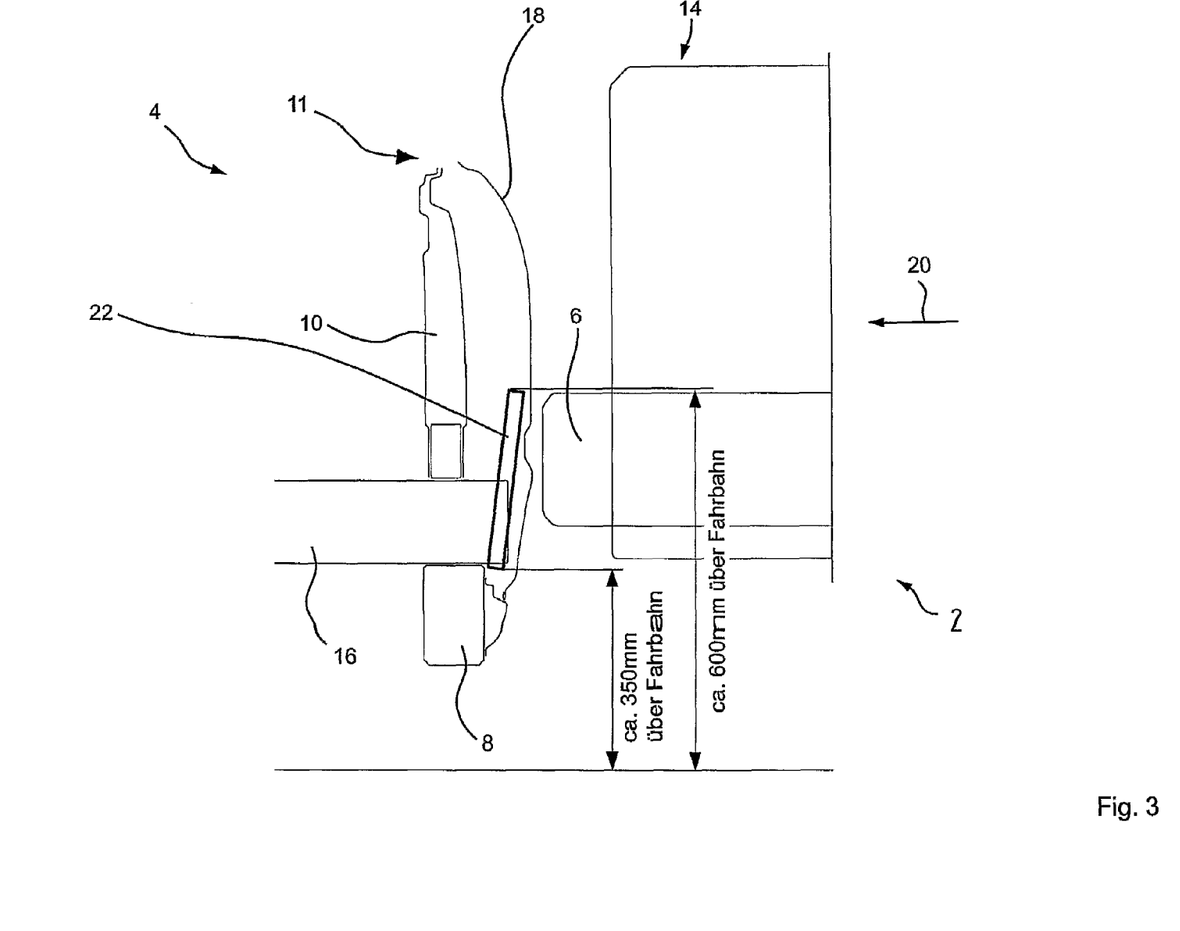
FIG. 3 shows the impact situation according to FIG. 2, with reference to the participating structural elements of a vehicle according to the invention.

In FIG. 3, the impact situation according to FIG. 2 is again shown schematically with reference to a vehicle structure of a convertible that has been further developed according to the invention.

Only the front bumper 6 and front area 14 of the laterally impacting vehicle 2 are shown, whereas only the structural parts of the second vehicle 4, that are essential in the present context are shown, namely, the side-sill arrangement 8, the B-pillar 10, and a transverse reinforcement 16. A side outer shell of vehicle 4 is denoted by 18.

Height conditions are shown relatively realistically, so that it is apparent that the bumper 6, during a side impact in the direction of arrow 20, normally would have a tendency to deflect upward over the longitudinal support arrangement 8 after a relatively slight deformation of its lower area, if the bumper 6 is not already in a position above the side-sill arrangement 8 of the second vehicle 4, as shown, in which it would protrude relatively unhampered against the B-pillar 10 and deform it far inward, since the B-pillar ends freely in the area of the parapet line 11 of the vehicle 2 and is not supported on a roof frame.

To solve this problem, it is proposed, according to the invention, that a plate-like impact element 22 be fastened to a lateral, outer end of the transverse reinforcement 16, in order to form a side-impact protection that extends into the area of the upper end of the bumper 6 of the laterally impacting vehicle 2 and thus prevents it from striking the B-pillar 10.

Figure 4:
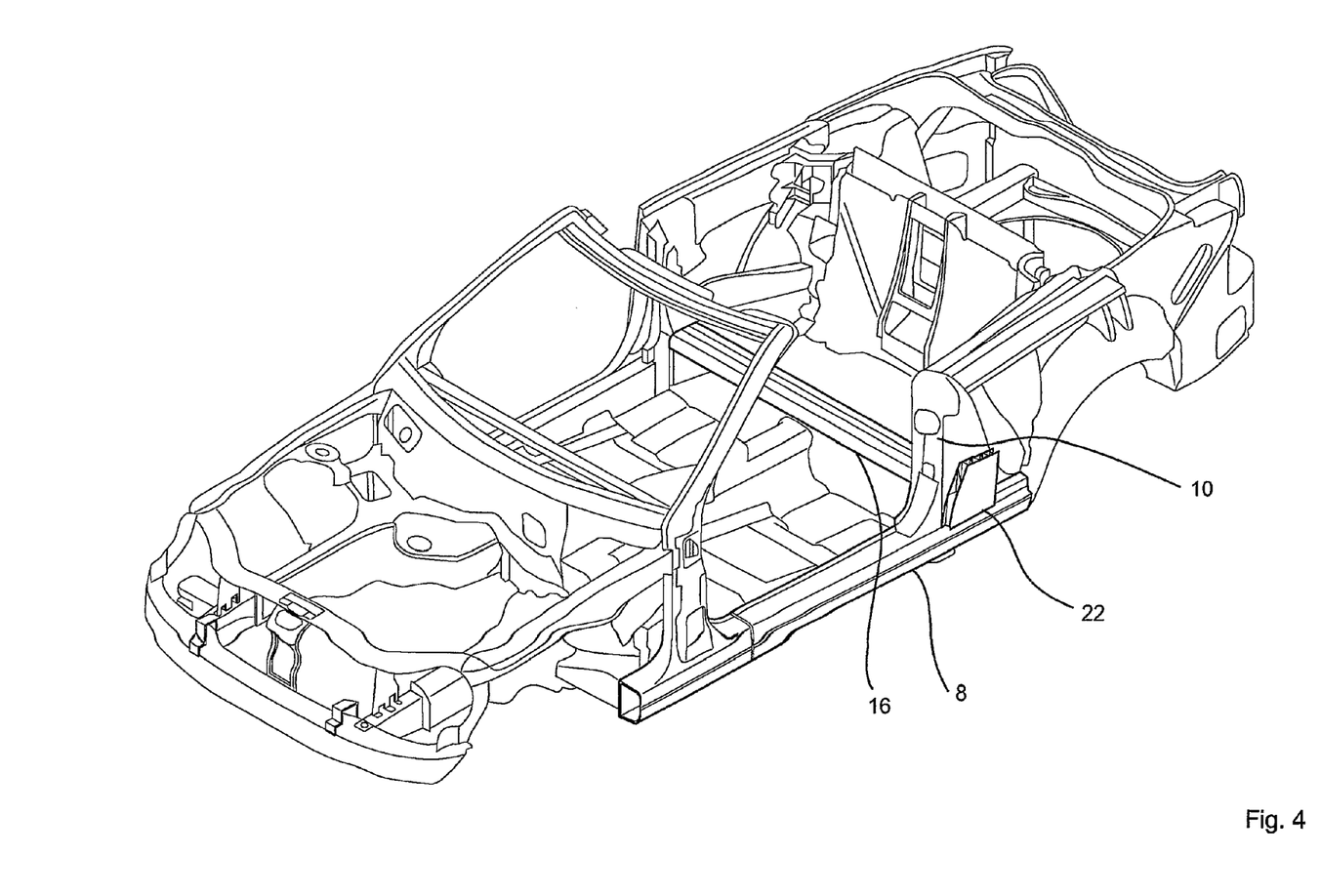
FIG. 4 shows a schematic perspective view of a vehicle body with a side-impact protection according to the invention.

FIG. 4 shows, in a schematic perspective view of a vehicle body, an example embodiment for the arrangement of impact element 22. A transverse reinforcement 16 in the form of a profiled transverse support extends straight from one side of the vehicle to the other, the side outer end areas of the transverse reinforcement 16 each lying above the side-sill arrangement 8 and behind the B-pillar 10, as follows clearly from FIG. 5, which shows an enlarged cutout from FIG. 4.

Figure 5:
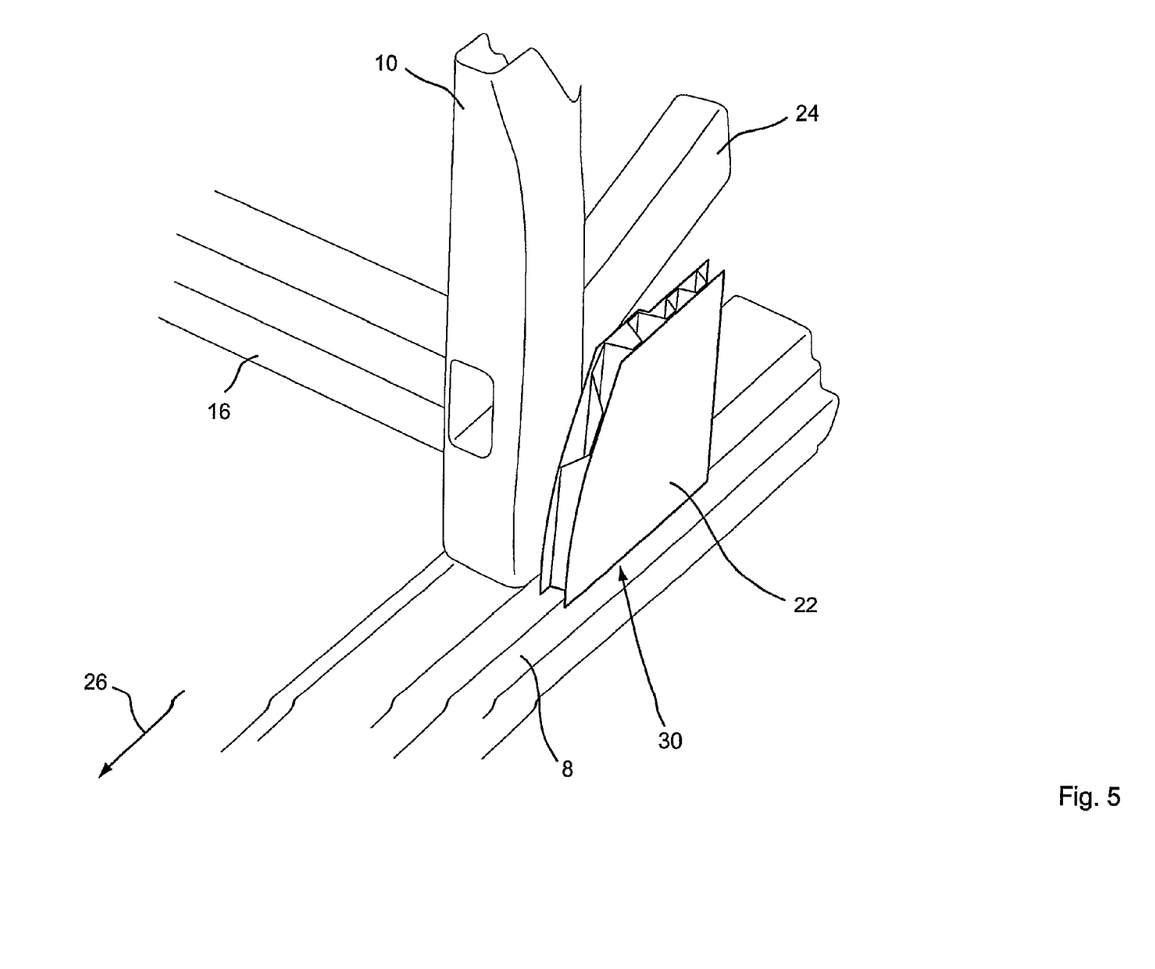
FIG. 5 shows a partial area from FIG. 4 in an enlarged view.

It is initially apparent from FIG. 5 that the B-pillar, during partial penetration of the side-sill arrangement 8, is inserted into the cutouts made in them and welded to them. In a similar manner, a longitudinal support 24 is inserted into the cutouts of the B-pillar 10 and welded to them. The transverse support 16, with its side outer end area 28 (see FIGS. 6, 9), viewed in the direction of travel 26, extends behind the B-pillar 10 and above the side-sill arrangement 8, beneath the longitudinal support 24.

Figure 6:
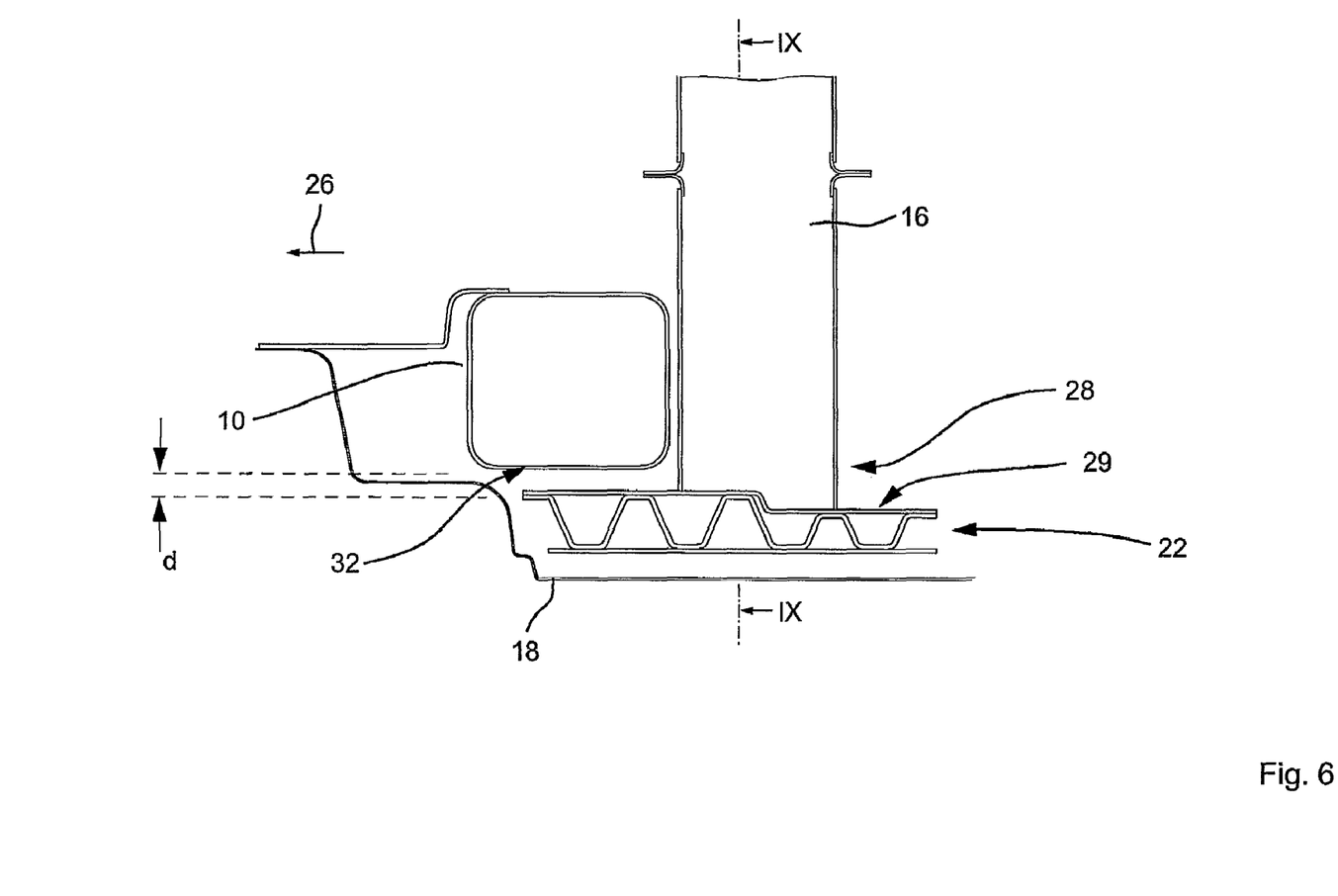
FIG. 6 shows a horizontal section of the partial area depicted in FIG. 5 along line VI-VI in FIG. 9.

As shown by the horizontal section in FIG. 6, the transverse reinforcement 16, with its side outer end 28, protrudes in the lateral direction or transverse direction of the vehicle over an outside 32 of the B-pillar 10. According to the invention, the impact element 22, with its inside 29, is attached to the side outer end 28 of the transverse reinforcement 16, specifically by welding.

By this arrangement, it is ensured that a spacing d amounting to several centimeters remains between the B-pillar 10 and its outside 32 and the inside 29 of the impact element 22.

Figure 9:
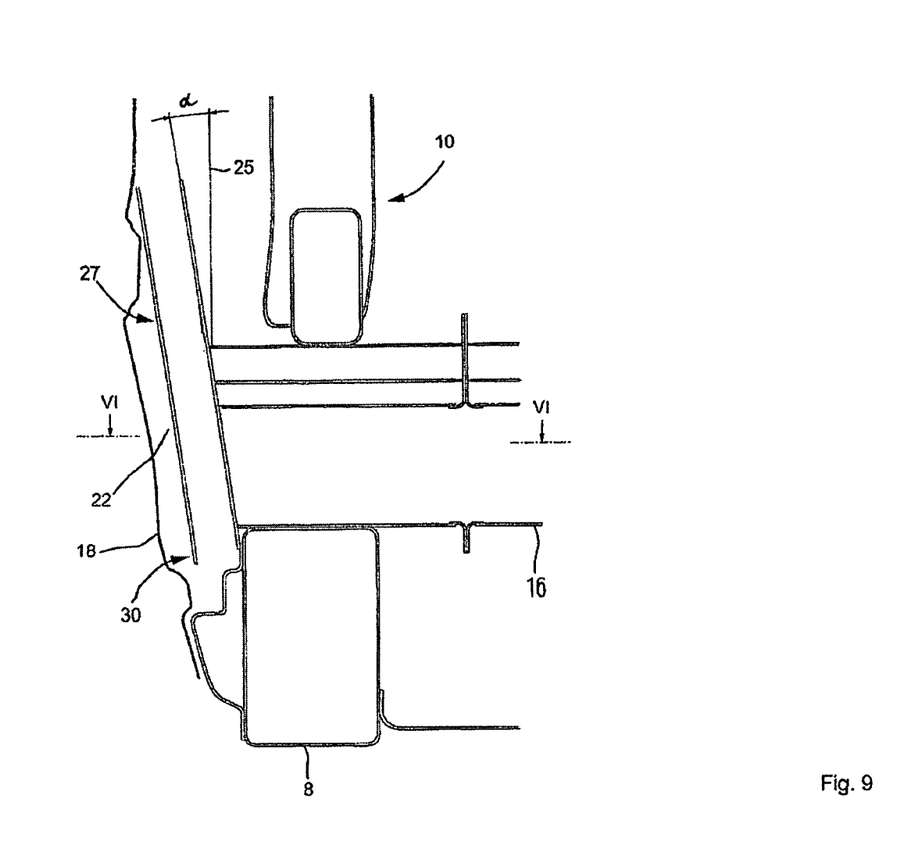
FIG. 9 shows a schematic vertical section along line IX-IX in FIG. 6 in the area of the transverse reinforcement and the B-pillar.

This state of affairs can also be seen in FIG. 9, from which it additionally follows that the impact element 22, at least its outer surface 27, is arranged to slope outward and downward at an angle $\alpha$ relative to the vertical 25, i.e., a plane running vertically to the horizontal, normal orientation of the vehicle. Angle $\alpha$ can be in the range from about 2° to about 20°, and in the example embodiment explained here, it lies at about 10°. This arrangement is appropriate for the reasons explained in the introduction in conjunction with FIG. 3, since, on the one hand, the bumper of the laterally impacting vehicle is prevented from easily sliding upward over the impact element and, on the other hand, the spacing d between the B-pillar 10 and the impact element 22 is increased upward and a reserve is therefore created for any unavoidable inward-directed deformations of the impact element 22, before the B-pillar 10 is deformed.

FIG. 9 also shows that the impact element 22, with the lower edge 30, lies laterally against the side-sill arrangement 8, and because of this, it is supported against side forces, so that side forces acting on the impact element 22 can be absorbed not only by the transverse reinforcement 16, but additionally by the side-sill arrangement 8.

Figure 7:
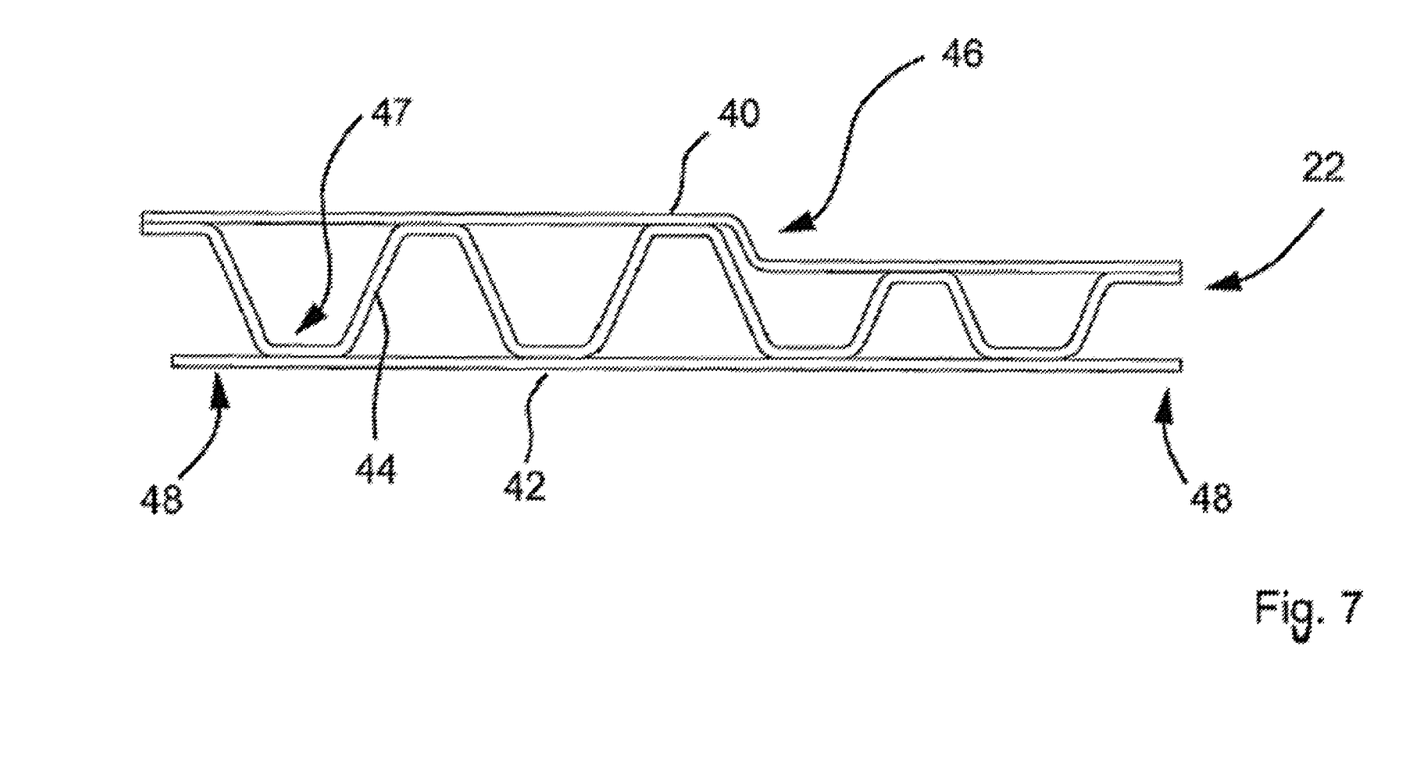
FIG. 7 shows a horizontal section of an impact element according to FIG. 6.
Figure 8:
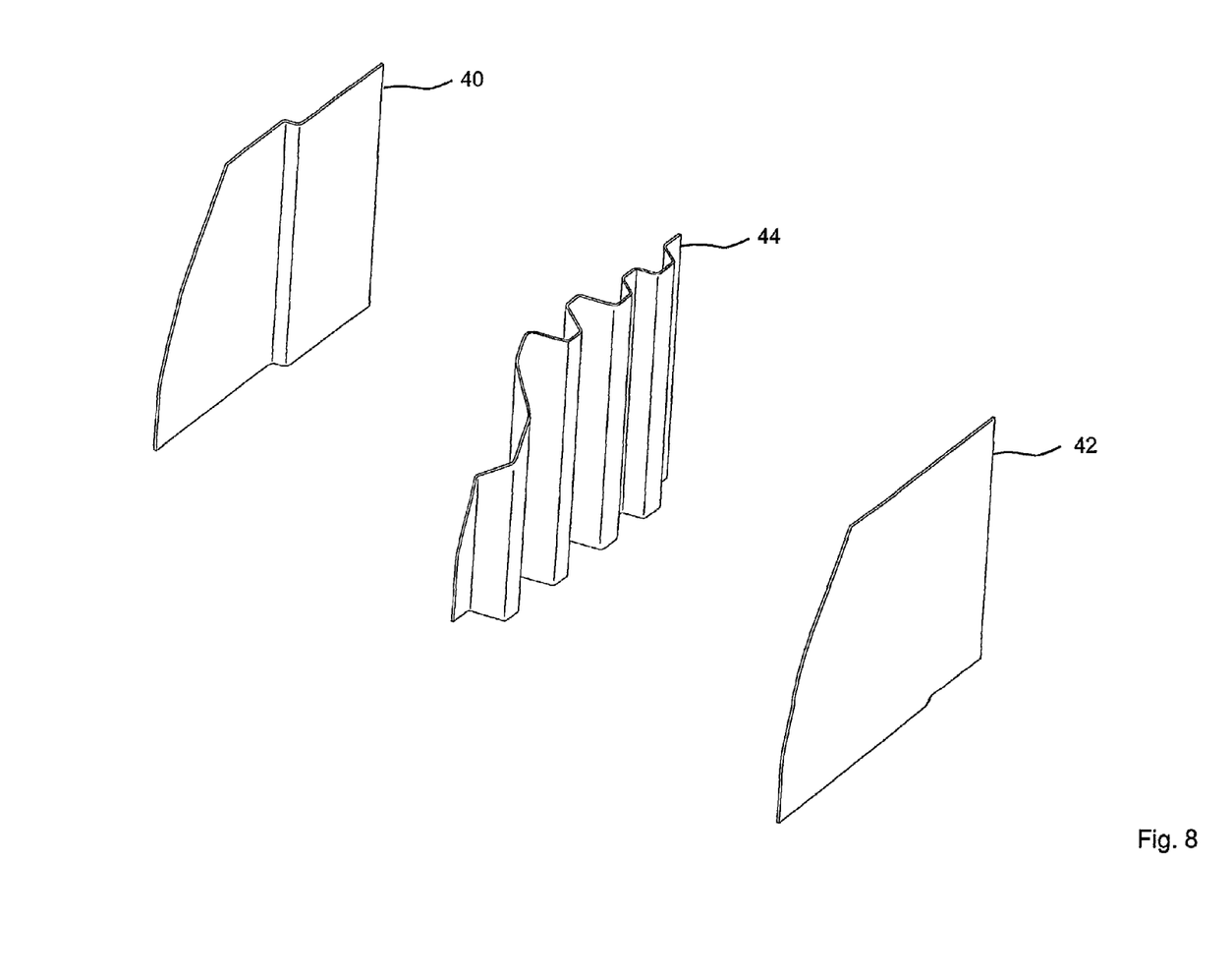
FIG. 8 shows three components of the impact element according to FIGS. 6 and 7, designed as a honeycomb sheet.

With reference to FIGS. 7 and 8, a variant of the impact element 22 is described below. In the form shown, the impact element 22 has an inner shell 40 consisting of sheet metal, an outer shell 42 consisting of sheet metal, and a reinforcement structure 44 connecting them and arranged between them. The reinforcement structure 44 in this example consists of sheet metal angled in a zigzag manner, in which flat connection areas 47 for connection to the inner and outer shell 40, 42 are provided, whereby the connection is made by spot welding or plug welding. The inner and outer shells 40, 42 and reinforcement structure 44 preferably consist of high-strength sheet metal.

The inner shell 40 has a flanging 46, so that the finished impact element 22 is partly retracted on the inside, in order to leave room for a rear side window.

FIG. 7 also shows that the reinforcement structure 44 is arranged so that the outer shell 42 is not supported in its front and rear edge areas 48. This has the advantage that in the event of a side collision, the edge areas 48 are deformed inward without the impact element 22 being deformed as a whole, which leads to improved directing of the force into the front area of the laterally impacting vehicle.

The invention claimed is:

1. A vehicle (2), comprising:
two side sill arrangements (8);
two B-pillars (10) extending into the side-sill arrangements (8);
a transverse reinforcement (16) extending above the side-sill arrangements (8) and adjacent to a lower end of the B-pillars (10) in a direction transverse to the vehicle; and
a plate-like impact element (22), arranged in a direction longitudinal to the vehicle and substantially upright, the plate-like impact element (22) having an inside (29) that is connected to a side outer end (28) of the transverse reinforcement (16);
wherein the transverse reinforcement (16) extends between the two B-pillars (10) and the two side-sill arrangements (8) of the vehicle and is provided on both sides of the vehicle with an impact element (22).

2. A vehicle according to claim 1, wherein the side outer end (28) of the transverse reinforcement (16) is arranged in the direction of travel behind the B-pillar (10).

3. A vehicle according to claim 1, wherein the side outer end (28) of the transverse reinforcement (16) protrudes in the lateral direction beyond an outside (32) of the B-pillar (10), so that the inside (29) of the impact element (22) has a spacing (d) from the outside (32) of B-pillar (10).

4. A vehicle according to claim 1, wherein a lower-edge (30) of each impact element (22) is connected to each side-sill arrangement (8).

5. A vehicle according to claim 1, wherein a lower edge (30) of each impact element (22) is arranged supported against an outside of each side-sill arrangement (8).

6. A vehicle according to claim 1, wherein each impact element (22) at least partially covers the side outer end (28) of the transverse reinforcement (16) in the B-pillar (10) in the longitudinal direction.

7. A vehicle according to claim 1, wherein an outer surface (27) of each impact element is arranged vertically or sloped outward from a vertical position at an angle ($\alpha$).

8. A vehicle according to claim 7, wherein each angle ($\alpha$) of the impact element (22) is adapted to an outer shell contour (18) of the vehicle.

9. A vehicle according to claim 1, wherein each impact element (22) extends to a height of about 60 cm above the ground.

10. A vehicle according to claim 1, wherein each impact element has an essentially horizontal upper edge.

11. A vehicle according to claim 1, wherein each impact element (22) is bonded and/or shape-fitted with the transverse reinforcement (16).

12. A vehicle according to claim 1, wherein each impact element (22) is designed as a plate made of a solid material.

13. A vehicle according to claim 1, wherein each impact element (22) is designed as a plate-like composite part.

14. A vehicle according to claim 13, wherein each impact element (22) has an inner shell (40), an outer shell (42), and a reinforcement structure (44) arranged between the inner shell (40) and the outer shell (42).

15. A vehicle according to claim 14, wherein each impact element (22) is designed as a honeycomb sheet, in which the inner and outer shells (40, 42) consist of sheet metal and the reinforcement structure (44) consists of sheet metal angled in a zigzag manner.

16. A vehicle according to claim 14, wherein each impact element (22) is designed as a honeycomb sheet in which the inner and outer shells (40, 42) are formed from sheet metal and the reinforcement structure is designed in the form of honeycomb elements extending in the transverse direction.

17. A vehicle according to claim 1, wherein an outer surface (27) of each impact element (22) is sloped outward from a vertical position at an angle ($\alpha$) within a range from 2° to 20°.

18. A vehicle (2), comprising:
a side sill arrangement (8);
a B-pillar (10) extending into the side-sill arrangement (8);
a transverse reinforcement (16) extending above the side-sill arrangement (8) and adjacent to a lower end of the B-pillar (10) in a direction transverse to the vehicle; and
a plate-like impact element (22), arranged in a direction longitudinal to the vehicle and substantially upright, the plate-like impact element (22) having an inside (29) that is connected to a side outer end (28) of the transverse reinforcement (16);
wherein the side outer end (28) of the transverse reinforcement (16) protrudes in the lateral direction beyond an outside (32) of the B-pillar (10), so that the inside (29) of the impact element (22) has a spacing (d) from the outside (32) of B-pillar (10).

19. A vehicle according to claim 18, wherein the impact element (22) has an inner shell (40), an outer shell (42), and a reinforcement structure (44) arranged between the inner shell (40) and the outer shell (42).

* * * * *